United States Patent [15] 3,697,212
Herbst [45] Oct. 10, 1972

[54] MOLDING PRESS
[72] Inventor: Richard Herbst, Munich, Germany
[73] Assignee: Krauss-Maffei Aktiengesellschaft, Munich, Germany
[22] Filed: April 16, 1971
[21] Appl. No.: 134,680

[30] Foreign Application Priority Data

April 24, 1970 Germany..........P 20 19 883.8

[52] U.S. Cl..................................425/450, 100/269
[51] Int. Cl................................................B29c 3/00
[58] Field of Search ......425/450, 451; 100/269, 288, 100/289

[56] References Cited

UNITED STATES PATENTS 2,492,259 12/1949 Beuscher...................425/450
2,689,978 9/1954 Roger........................425/450
3,327,353 6/1967 Eggenberger.............425/450
3,335,463 8/1967 Allard et al................425/450

Primary Examiner—Robert L. Spicer, Jr.
Attorney—Michael S. Striker

[57] ABSTRACT

A molding press has hydraulic transporting means for rapidly moving a mold-supporting movable platen toward and away from a fixed mold-supporting platen. A hollow main piston is connected by coupling means with a connecting beam projecting from the movable platen to open and close the mold with great force. Before the transporting means retract the movable platen, the coupling means is withdrawn from the path of the beam so that the beam can enter the hollow piston whereby the length of the machine is reduced.

11 Claims, 1 Drawing Figure

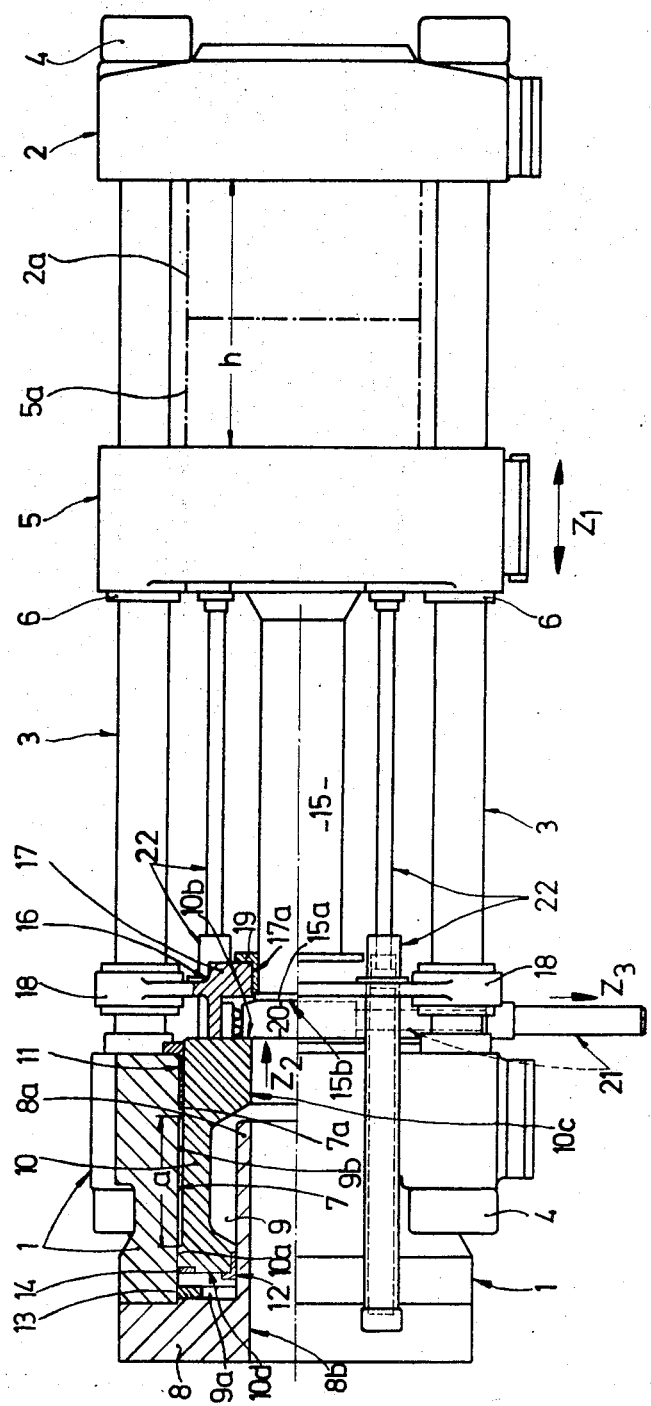

MOLDING PRESS

BACKGROUND OF THE INVENTION

The present invention relates to apparatus for closing and opening a mold, particularly used with injection molding machines for synthetic plastic materials.

In a molding machine of this type, very great forces are required for closing and again opening the mold without any deformation of the movable platen which supports one mold half. On the other hand, the movable platen must be moved great distances with sufficient speed during the approach of the movable platen to the proximity of the cooperating fixed mold-supporting platen. The required transporting and force transmitting devices must be arranged in such a manner that the length of the molding press is as short as possible, considering the required spacing of the mold-supporting platens in the inoperative position.

It is known to use the main piston not only for closing the mold, but also for transporting the movable platen a great distance for fully separating the movable and fixed platens. In such arrangements, the piston cannot be designed in the best manner for small and large forces, particularly if the cylinder is large enough for the required force, and long enough for the required distance of movement of the movable platen, a very large cylinder and piston is required which is expensive and uneconomical, and requires a very large pump and prime mover.

The German Pat. No. 1,006,590 discloses an apparatus in which a large piston with great diameter and short distance of movement of the piston, is used only for supplying the great force required for closing the mold, while on the other hand separate hydraulic transporting means with small cylinders and pistons are provided for moving the movable platen at high speed at great distance. A mold-closing piston is provided, but cannot be used for opening the mold since only forces acting in mold closing direction can be transmitted. For opening the mold, the mold closing cylinder and piston means must be retracted in transverse direction, which causes a great loss of time. Due to the movable arrangement of the mold-closing piston, and of a pressure member on the movable platen, undesired displacements or deformations of the movable platen occur when the mold is closed by the action of a great force.

SUMMARY OF THE INVENTION

It is one object of the invention to overcome the disadvantages of known molding machines, and to provide a molding machine with a mold closing and opening apparatus which does not increase the length of the machine.

Another object of the invention is to provide reliable guidance of all force transmitting parts and of the movable platen.

Another object of the invention is to provide a molding press in which mold closing, mold openings, and mold transporting operations are efficiently carried out without deformation of the movable mold-supporting platen.

Another object of the invention is to provide a mold-closing and opening apparatus which permits the adaptation to molds of different height.

Generally speaking, an embodiment of the invention comprises a main cylinder and a hollow, preferably tubular, piston; a movable platen for opening and closing a mold and including a connecting means in the form of a beam projecting toward the piston aligned with the same and having a free end in the proximity of the piston; first force transmitting means operable between a pressure transmitting position located between the piston and the free end of the connecting beam for transmitting mold-closing motion from the piston to the connecting beam and the movable platen, and an inoperative position retracted from the connecting means and piston; second force transmitting means for transmitting mold-opening motion from the piston to the connecting beam and movable platen when the first force transmitting means is in the retracted inoperative position outside of the path of movement of the connecting beam toward the piston; and transporting means operable when the first force transmitting means is in the retracted inoperative position for rapidly transporting the movable platen and the connecting beam to a position in which the connecting beam is at least partly located in the hollow piston. Since the length of the piston is used, the molding press can be shorter than constructions of the prior art.

The preferred embodiment of the invention comprises the following features:

a. Only for producing the mold closing force and mold opening force, a main cylinder and piston means is provided whose cylinder is fixedly secured to a fixed support at one end of the machine, and whose piston divides the cylinder into two chambers, b. the movable mold-supporting platen carries a rigid connecting beam projecting toward the main piston, c. the main piston is at least partly an annular piston or hollow piston in which the connecting beam is located when the movable platen is fully retracted, d. between the main piston and the connecting beam, a coupling device acting in both direction of movements of the movable platen is provided for transmitting mold opening and closing forces form the main piston to the movable platen, and which is at least in mold-closing direction rigid so that great pressure can be transmitting through the connecting beam to the movable platen from the piston, e. the connecting beam is guided, and the respective guide ring is located at the free end of the connecting beam when the movable platen closes the mold, and f. for the approach and retraction movement of the movable mold-supporting platen, hydraulic transporting means including cylinders and pistons are provided which rapidly move the movable platen to a position in which mold closing and opening operations are controlled by the main piston.

Due to the fact that the main piston is mounted in the end support, it is possible to rigidly mount the connecting pressure beam on the movable mold plate, and to guide the beam near its free end, which improves the guidance of the movable mold-supporting platen. The central opening in the main piston, and preferably also in the fixed support, permits the entering of the connecting beam during retraction of the movable platen with the respective mold, so that the length of the piston is used for reducing the length of the machine.

Due to the provision of independent transporting means, the main cylinder and piston means can be designed only for the purpose of producing a very great mold closing force. The coupling device acting in both directions of the movement of the movable platen and main piston, makes it possible to provide an annular surface on the main piston which supplies the mold-opening force.

Preferably, the main piston is a differential piston, so that a greater effective pressure surface can be provided for obtaining the mold-closing force, and a smaller effective area can be provided for producing the mold-opening force, while only one main piston is used.

For guidance of the connecting beam, a guide ring is provided which is guided on two guide rails, and secured to the main piston for movement with the same. This arrangement permits the guidance of the connecting beam at its free end, which is provided with a flange, so that a jamming or edging of the movable platen is prevented.

The flange at the free end of the connecting beam abuts the guide ring on the side where the main piston is located, and between the guide ring and the main piston, a space is provided into which a rigid pressure transmitting block can be moved so that pressure is transmitted in the mold closing position from the main piston to the rigid block and by the same to the free end of the connecting beam which is secured to the movable platen. The pressure forces for closing the mold are transmitted by the rigid block, and the guide ring connected with the main piston transmits to the connecting beam and movable platen, the required mold opening force.

It is advantageous to provide a hydraulic control device for placing the main piston in a preferred position within a range of different positions within the main cylinder. Due to the adjustment of the mold opening and closing main cylinder and piston means, the same can be adapted to different heights of the mold between the movable platen and the fixed platen.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a plan view, partially in horizontal section, illustrating an embodiment of the invention.

DESCRIPTION OF THE PREFERRED EMBODIMENT

The molding press illustrated in the drawing has a fixed support 1, and a fixed mold-supporting plate 2 which are connected with each other by guide columns or rails 3 by means of nut 4. A movable mold-supporting platen 5 has tubular slide members guided on guide rails 3 in the direction of the arrow $Z_1$ in a mold closing direction, and in an opposite mold opening direction.

The movable platen 5 and the fixed plate 2 support the two mold halves 2a and 5a which are illustrated as a closed mold forming a mold space.

The fixed support 1 has a central inner cylinder 7 whose axis extends in the direction of the arrow $Z_1$, and which forms, together with a sealed end plate 8, and a tubular wall 8a, an annular cylinder space 9 for receiving a substantially tubular or annular main piston 10.

The inner surface of cylinder 7 has an inwardly projecting annular projection 7a, and the outer surface of the main piston 10 has an outwardly projecting annular projection 10a. Cylinder 10 is shown in an end position in which its end face 10d abuts a ring 13, but is movable a distance $a$ to a position in which projection 10a abuts projection 7a. Seiling and guide elements 11, 12 and 14 are provided so that piston 10 divides the annular cylinder space 9 into a cylindrical annular chamber 9b, and an annular chamber 9a adjacent the end face 10d of piston 10.

When pressure fluid is supplied to chamber 9a, main piston 10 moves in the direction of the arrow $Z_2$ for providing a mold closing force, and when pressure fluid id supplied to chamber 9b, piston 10 moves in a direction opposite to the arrow $Z_2$ to provide a mold opening force. The means for supplying the operating liquid into the cylinder 7 are conventional, and not shown. In the position shown in the drawing, main piston 10 is in an end position, and can move a distance $a$ in the direction of the arrow $Z_2$. Generally, piston 10 will be in an intermediate position, and capable of moving in opposite directions. The position of piston 10 in cylinder 7 depends on the height $h$ of the closed mold 2a, 5b between fixed platen 2 and movable plate 5.

A connecting beam 15 is secured to the movable plate 5, and projects toward the fixed support 1 and cylinder and piston means 7, 10 so that its free end is located in the proximity of a coupling device 16.

Coupling device 16 has annular slides 18 by which the ring 17 of coupling device 16 is guided on the guide rails 3. Ring 16 is fixedly secured to the annular end face of piston 10 which surrounds the central opening 10c formed by an annular piston end portion. The inner surface 10c of the annular piston portion is aligned with an inner surface 8b of cylinder wall 8a and end plate 8 of the cylinder forming support 1. Consequently, during movement of piston 10, the coupling device 16 will move with piston 10.

Ring 17 of the coupling device 16 has an inner circular surface 17a to which a guide bushing 19 is secured, so that the free end of connecting beam 15 is guided in the guide ring means 19, 17. The free end of connecting beam 15 has a flange 15a which is located on the piston side of guide ring 17, 19, abutting the annular end face of guide ring bushing 19 in the illustrated position.

It will be seen that movement of main piston 10 in a direction opposite to the arrow $Z_2$, will take along coupling device 16 with guide ring 17, 19 so that by pressure on flange 15a, connecting beam 15 and movable platen 5 are moved in the direction opposite to the direction of the arrow $Z_2$ in a mold opening motion.

In addition to the first force-transmitting means 17, 19, 15a which transmit mold opening motion and a pulling force to connecting beam 15 and movable plate 5, second force-transmitting means in the form of a rigid block 10 are part of the coupling means 16. In the illustrated position, the rigid block 20 abuts the piston end face 10b, and is located between the same and the outer end face 15b of flange 15a. The thickness of the pressure transmitting rigid block 20 is selected so that there is a little play between block 20 and end faces 10b and 15b. Operating means 21 are provided and are connected with block 20 for moving the same out of the illustrated operative pressure transmitting position to a retracted position withdrawn in the direction of the arrow $Z_3$.

The diameters of the cylindrical inner surfaces 10c of piston 10, and 8b of fixed support 8, are selected so that they are greater than the diameter of the flange 15a, permitting connecting beam 15 to enter the central space within inner surfaces 10c and 8b when the block 20 is retracted in the direction of the arrow $Z_3$ by the operating means 21.

Hydraulic piston and cylinder means are provided for rapidly transporting the movable platen 5 along the guide rails 3. The cylinders of transporting means 22 are secured to the guide ring 17 of the coupling device 16, and the piston rods are secured to the movable platen 5. While main piston 10 has a large diameter, and moves a short distance for displacing the movable platen 5 a short distance during mold opening and closing operations, the cylinders of transporting means 22 have a small diameter, and the pistons of the same are movable in the cylinders a great distance, as required for rapid movement of platen 5 for approaching the mold closing position, and for moving out of the mold opening position.

OPERATION

During a molding operation, the apparatus in the illustrated position, but piston 10 may be in an intermediate position in which the distance a is smaller, in accordance with the height h of the mold 5a, 2a. Pressure fluid is supplied to the chamber 9a so that the main piston 10 transmits pressure through the pressure transmitting block 20 to the connecting beam 15 to the movable platen 5 so that the mold half 5a is pressed against the mold half 2a, the occurring reaction forces being taken up by the guide rails 3 as tensile forces acting on the support 1.

After completion of the molding operation, liquid is discharged from chamber 9a, and the pressure transmitting block 20 is retracted in the direction of the arrow $Z_3$ out of the region of piston 10 and flange 15a to a position located outside of the path of movement of connecting beam 15 in the direction opposite to the arrow $Z_2$. The annular chamber 9a is supplied with pressure fluid, so that main piston 10 moves a small distance, less than the distance a, in a direction opposite to the arrow $Z_2$, and transmits a pulling force through guide and coupling ring 17, 19, flange 15a and connecting beam 15 to the movable platen 5 which is retracted from the fixed platen 2 so that the mold 5a, 2a, is opened.

Pressure fluid is now supplied to the hydraulic transporting means 22 so that the movable platen 5 is moved rapidly toward the guide and coupling ring 17, 19 to which the cylinders thereof are secured. During this rapid movement, the mold halves 5a, 2a are completely opened.

During the movement of the movable platen 5 toward support 1 and piston 10, the connecting beam 15 passes first into the opening formed by the inner surface 10c of the annular piston portion of piston 10, and then into the space surrounded by the inner surface 8b of the tubular wall 8a.

After the molded workpiece has been removed from the opened mold halves 2a and 5a, pressure fluid is supplied to the cylinders of the transporting means 22 so that the movable platen 5 moves rapidly in the direction of the arrow $Z_2$ toward the fixed platen 2, and closes mold 5a, 2a. Thereupon, *the pressure transmitting block 20 is moved in the direction opposite to the arrow $Z_3$ to the pressure transmitting operative position* shown in the drawing, while some play remains between the block 20 and the end faces 10b, and 15b.

When pressure fluid is again supplied to chamber 9a, main piston 10 moves in the direction of the arrow $Z_2$, transmitting pressure through the rigid block 20 to flange 15a and connecting beam 15 to platen 5 so that a great mold closing force is transmitted to the mold halves 5a and 1a by the movable platen 5.

In order to adapt the apparatus to the varying height h of different molds, main piston 10, and with the same the entire coupling device including ring 17 and rigid block 20, and with ring 17 also transporting means 22 can be placed in the required position, while the distance a between the annular projection 7a and 10a is varied in accordance with the height h of the used mold. In this manner, the machine is hydraulically adapted to the different heights of different molds.

In a modification, main piston 10 is not constructed as a tubular piston, as shown, but as a piston closed at the outer end, so that the end face 10d is not annular, but a circular area. However, the inner circular surface 10c is retained by an annular piston portion at the inner end of piston 10.

After movement of the rigid block 10 to the inoperative position, the free end of connecting beam 15 enters the interior 9, 10c of the annular portion of piston 10, but of course does not come into contact with the modified outer end wall. While in this manner, the distance of movement of connecting beam 15 into the piston 10 is reduced, a greater surface 10d is available in the pressure chamber 9a for producing great hydraulic pressure on the movable platen 5 during the mold closing operation.

According to a further modification, the double-acting main piston 10, which has pressure chambers 9a and 9b, may be replaced by two single acting pistons which inter-engage each other in the manner of plunger pistons, so as to derive the mold closing force from one of these pistons, and the mold opening force from the other.

It will be understood that each of the elements described above, or two or more together, may also find a useful application in other types of molding machines differing from the types described above.

While the invention has been illustrated and described as embodied in a molding press in which a main piston controls mold closing and mold opening operations, while hydraulic transporting means rapidly retract and advance a movable platen provided with a connecting beam entering the hollow main piston in the retracted position of the movable platen, it is not intended to be limited to the details shown, since various modifications and structural changes may be made without departing in any way from the spirit of the present invention.

Without further analysis, the foregoing will so fully reveal the gist of the present invention, that others can by applying current knowledge readily adapt it for various applications without omitting features that, from the standpoint of prior art, fairly constitute essentially characteristics of the generic or specific aspects of this invention and, therefore, such adaptions should and are intended to be comprehended within the meaning and range of equivalence of the following claims,

What is claimed as new and desired to be protected by Letters Patent is set forth in the appended claims.

I claim:

1. Molding press comprising guide means; a mold-supporting fixed platen secured to one end of said guide means; a mold-supporting movable platen mounted on said guide means for movement toward and away from said fixed platen; a fixed support secured to the other end of said guide means and having a cylinder; piston means mounted in said cylinder for movement toward and away from said fixed platen, and dividing said cylinder into first and second chambers so that said piston means can be operated by supply of fluid to and from said chambers, said piston means having an annular piston portion; a connecting means secured to said movable platen and projecting from the same toward said fixed support and said piston means and having a free end, and being movable with said movable platen between mold closing and opening positions spaced from said piston means, and an inoperative position partly located in said annular piston portion; coupling means connecting said connecting means with said piston means in said mold closing and opening positions so that said piston means can operate said movable platen to close and open a mold between said fixed and movable platens, said coupling means including pressure transmitting means rigidly connecting said piston means with said connecting means at least during mold closing movement of said movable platen toward said fixed platen; guide means guiding said connecting means while moving the latter from one of said positions to the others, said guide means being so arranged that the latter is effective at said free end of the connecting means in said mold closing and opening positions; and transporting means connected with said movable platen for rapidly moving the latter from said mold opening position to said inoperative position, and from said inoperative position to said mold closing position.

2. Molding press as claimed in claim 1 wherein said connecting means includes a pressure beam having a free end located spaced from said piston means in said mold closing and opening positions, and at least partly located in said annular piston portion in said inoperative position.

3. Molding press as claimed in claim 2 wherein said piston means includes a tubular piston having said annular piston portion; wherein said fixed support has a tubular wall portion guiding the inner surface of said tubular piston; and wherein said free end of said pressure beam passes through said annular piston portion and tubular wall portion and projects out of said fixed support in said inoperative position of said pressure beam and movable platen.

4. Molding press as claimed in claim 1 wherein said coupling means is guided on said guide means for movement with said piston means.

5. Molding press as claimed in claim 1 wherein said connecting means includes a pressure beam having a free end located spaced from said piston means in said mold closing and opening positions; and wherein said coupling means includes a coupling part secured to said piston means for movement, and guided by said guide means for movement along the same, said coupling part being connected with said free end of said pressure beam for movement with said piston means and said movable platen away from said fixed platen; and operating means for moving said pressure transmitting means between a retracted inoperative position, and a pressure transmitting position located between said piston means and said free end of said pressure beam for transmitting pressure from said piston means to said free end during movement of the same toward said fixed platen so that said movable platen moves toward said fixed platen for closing the mold in said mold closing position.

6. Molding press as claimed in claim 5 wherein said coupling part includes a guide ring; wherein said free end of said pressure beam passes through said guide ring and has a flange abutting the same during movement of said piston means with said coupling part and guide ring away from said fixed platen; and wherein said pressure transmitting means includes a rigid block having an operative position located between said flange and said piston means, and a retracted position in which said free end can enter said annular piston portion when transported by said transporting means.

7. Molding press as claimed in claim 6 wherein said rigid block abuts in said operative position said annular piston portion and said flange for transmitting motion from said piston means to said movable platen in a mold closing direction parallel to said guide means; wherein said block moves transverse to said direction between said operative and retracted positions thereof; and wherein said transporting means are connected with said guide ring.

8. Molding press as claimed in claim 1 wherein said piston means is a different piston; and wherein said piston has a cylindrical outer surface forming said first chamber with the inner surface of said cylinder, and has an end face forming said second chamber with the end face of said cylinder.

9. Molding press as claimed in claim 8 wherein said piston means includes an outer annular projection sliding on said inner surface of said cylinder; wherein said cylinder has an inner annular projection on which said outer surface of said piston means slides; wherein said first chamber is formed between said inner and outer annular projections; wherein said inner and outer projections have an abutting position determining one end of the stroke of said piston means; and wherein at the other end of the stroke of said piston means, said end face of said piston means partly abuts the end face of said cylinder forming said first chamber with the same.

10. Molding press as claimed in claim 9 including hydraulic means for placing said piston means in said cylinder in an intermediate position so that said movable platen is placed in a position for holding a mold of predetermined size together with said fixed platen.

11. In a molding press, in combination, a main cylinder and a hollow piston located in said cylinder; a movable platen for opening and closing a mold, and including a connection means projecting toward said piston aligned with the same and having a free end; first force transmitting means operable between a pressure transmitting position located between said piston and said free end of said connecting means for transmitting mold-closing motion from said piston to said connecting means and movable platen, and an inoperative position retracted from said connecting means and piston; second force transmitting means for transmitting mold-opening motion from said piston to said connecting means and movable platen when said first force transmitting means is in said retracted inoperative position outside of the path of movement of said connecting means toward said piston; and transporting means operable when said first force transmitting means is in said retracted inoperative position for rapidly transporting said movable platen and said connecting means to a position in which said connecting means is at least partly located in said hollow piston.

* * * * *